(12) United States Patent
Kurimura et al.

(10) Patent No.: US 7,556,433 B2
(45) Date of Patent: Jul. 7, 2009

(54) FLUID DYNAMIC BEARING DEVICE AND MOTOR EQUIPPED WITH THE SAME

(75) Inventors: Tetsuya Kurimura, Mie-ken (JP); Yoshiharu Inazuka, Mie-ken (JP); Takehito Tamaoka, Kyoto-fu (JP)

(73) Assignees: NTN Corporation, Osaka (JP); Nidec Corporation, Kyoto (JP)

( * ) Notice: Subject to any disclaimer, the term of this patent is extended or adjusted under 35 U.S.C. 154(b) by 355 days.

(21) Appl. No.: 11/347,563

(22) Filed: Feb. 6, 2006

(65) Prior Publication Data
US 2006/0188187 A1 Aug. 24, 2006

(30) Foreign Application Priority Data
Feb. 17, 2005 (JP) .............................. 2005-041034

(51) Int. Cl.
*F16C 32/06* (2006.01)
*F16C 17/10* (2006.01)
*B21K 1/26* (2006.01)

(52) U.S. Cl. .................. 384/107; 384/100; 384/112; 29/898.049

(58) Field of Classification Search .............. 384/100, 384/107, 111–115, 119, 279; 29/989, 898.042, 29/898.04, 898.049
See application file for complete search history.

(56) References Cited

U.S. PATENT DOCUMENTS 5,281,035 A * 1/1994 Lo ............................. 384/279
5,363,003 A * 11/1994 Harada et al. ............ 310/67 R
5,810,481 A * 9/1998 Nii et al. .................... 384/279
5,822,846 A * 10/1998 Moritan et al. ............... 29/598
6,832,853 B2 * 12/2004 Fujinaka ...................... 384/100
6,921,208 B2 * 7/2005 Yamashita et al. ........... 384/107
7,025,505 B2 * 4/2006 Komori et al. ............... 384/107
7,267,484 B2 * 9/2007 Satoji et al. .................. 384/112
2003/0169952 A1 * 9/2003 Yamashita et al. ........... 384/107
2005/0044714 A1 * 3/2005 Yamashita et al. ....... 29/898.042
2007/0025652 A1 * 2/2007 Satoji et al. .................. 384/100

FOREIGN PATENT DOCUMENTS

| JP | 11190340 A | * | 7/1999 |
| JP | 2002-061637 A | * | 2/2002 |
| JP | 2002-061641 A | | 2/2002 |
| JP | 2002-147444 A | * | 5/2002 |
| JP | 2004028165 A | * | 1/2004 |
| WO | WO 02/10602 A1 | * | 2/2002 |
| WO | WO 2004092600 A1 | * | 10/2004 |

\* cited by examiner

*Primary Examiner*—Marcus Charles
(74) *Attorney, Agent, or Firm*—Arent Fox LLP.

(57) ABSTRACT

A fluid dynamic bearing device is mainly composed of a housing, a bearing sleeve, and a rotary member. The housing is formed by a side portion formed through injection molding of a resin material, and a bottom member fixed to a fixing portion provided in the inner periphery at one axial end of the side portion and adapted to close an opening at one axial end of the side portion. The fixing portion is a molding surface formed through solidification, in conformity with the inner surface of the mold, of the resin injected by the injection molding.

6 Claims, 5 Drawing Sheets

FLUID DYNAMIC BEARING DEVICE AND MOTOR EQUIPPED WITH THE SAME

BACKGROUND OF THE INVENTION

1. Field of the Invention

The present invention relates to a fluid dynamic bearing device rotatably supporting a shaft member by a dynamic pressure action in a non-contact support through the intermediation of a fluid (lubricating fluid) generated in a radial bearing gap. This bearing device is suitable for use in a spindle motor of an information apparatus, for example, a magnetic disc apparatus, such as an HDD or an FDD, an optical disc apparatus, such as a CD-ROM, a CD-R/RW, or a DVD-ROM/RAM, or a magneto-optical disc apparatus, such as an MD or an MO, the polygon scanner motor of a laser beam printer (LBP), or the small motor of an electric apparatus, such as an axial flow fan.

2. Description of the Related Art

Apart from high rotational accuracy, an improvement in speed, a reduction in cost, a reduction in noise, etc. are required of the motors as mentioned above. One of the factors determining such requisite performances is the bearing supporting the spindle of the motor. Recently, as such the bearing, use of a fluid dynamic bearing superior in the above requisite performances is being considered, or such a fluid bearing has been actually put into practical use.

For example, in a fluid dynamic bearing device to be incorporated into the spindle motor of a disk apparatus, such as an HDD, there is used a dynamic pressure bearing that is equipped with a radial bearing portion supporting a rotary member, which has a shaft portion and a flange portion, in the radial direction in a non-contact support, and a thrust bearing portion supporting the rotary member in the thrust direction in a non-contact support (see, for example, JP2002-61641A). In the dynamic pressure bearing, dynamic pressure grooves as dynamic pressure generating means are provided in the inner peripheral surface of a bearing sleeve constituting the radial bearing portion or in the outer peripheral surface of the shaft portion opposed thereto. Further, dynamic pressure grooves are provided in both end surfaces of the flange portion constituting the thrust bearing portions or in surfaces opposed thereto (e.g., an end surface of the bearing sleeve, or an end surface at the bottom of a housing).

As information apparatuses are improved in terms of performance, efforts are being made, regarding fluid dynamic bearing devices of this type, to enhance the machining precision and assembly precision of their components in order to secure the high bearing performance as required. On the other hand, as a result of the marked reduction in the price of information apparatuses, there is an increasingly strict demand for a reduction in the cost of fluid dynamic bearing devices of this type. Further, today, there is a fierce competition to develop information apparatuses reduced in size and weight, and as a result, there is also a demand for a reduction in the size and weight of fluid dynamic bearing devices of this type.

A housing is equipped with a substantially cylindrical side portion and a bottom portion closing an opening at one end of the side portion. The bottom portion may be formed integrally with the side portion, or separately from the side portion. In the latter case, a fixing portion is previously provided in the inner periphery of one end portion of the side portion, and a member (bottom member) constituting the bottom portion is fixed to this fixing portion by press-fitting, adhesive, etc.

In recent years, an attempt has been made to replace the housing, which has been a machined metal material, with an injection molding formed of a resin material in order to achieve a reduction in the cost and weight of fluid dynamic bearing devices. In particular, in the case of a housing whose bottom portion is formed as a separate bottom member, the realization of a resin housing is often attained by forming exclusively the side portion of a resin molding while forming the bottom member of a metal material, such as brass or an aluminum alloy as in the prior art. When thus forming exclusively the side portion of a resin molding, it is common practice to provide the gate of the injection resin molding at the portion constituting the fixing portion after injection molding. In this case, the fixing portion is formed by machining after cutting the gate.

It should be noted, however, that the dimensional accuracy required of the fixing portion of the side portion is generally strict, and the machining thereof must be conducted meticulously. Thus, an increase in machining cost is unavoidable, which means the advantage in terms of cost attained by using resin cannot be enjoyed to a sufficient degree. Further, there is a possibility of foreign matter generated as a result of machining remaining at the fixing portion. In that case, such foreign matter may enter the interior of the bearing device after the press-fitting of the bottom member and constitute a contaminant, thereby deteriorating the bearing performance.

SUMMARY OF THE INVENTION

It is an object of the present invention to achieve a reduction in the production cost of a fluid dynamic bearing device of this type, there by providing a less expensive fluid dynamic bearing device.

To achieve the above object, there is provided a fluid dynamic bearing device including: a housing formed as a bottomed cylinder; a bearing sleeve retained in an inner periphery of the housing; a rotary member having a shaft portion inserted into the bearing sleeve and adapted to rotate around a rotation center axis; and a radial bearing portion supporting the rotary member in a radial direction in a non-contact support by a dynamic pressure action of a fluid generated in a radial bearing gap between the bearing sleeve and the shaft portion of the rotary member, characterized in that: the housing has a side portion formed in a substantially cylindrical configuration of a resin material by injection molding, and a bottom member fixed to a fixing portion provided in an inner periphery of one axial end of the side portion and closing an opening at one axial end of the side portion; and the fixing portion is a molding surface formed through solidification, in conformity with an inner surface of a mold, of the resin material injected by the injection molding.

Here, the above-mentioned fluid (lubricating fluid) may be a liquid such as a lubricating oil (or lubricating grease) or a magnetic fluid, or a gas such as air.

By forming the side portion, which constitutes the housing, of an injection molding of a resin material, it is possible to produce a housing of higher precision and less weight as compared with the case in which it is formed of metal by machining, such as cutting, or press working. Further, since the fixing portion formed in the side portion and used to fix the bottom member is a molding surface formed through solidification, in conformity with the inner surface of the mold, of the resin injected by the injection molding, it is possible to form a high precision fixing portion easily and at low cost. Since the fixing portion is a smooth surface where no filler in the resin material is exposed, there is generated no minute foreign matter or the like which leads to contamination through friction when press-fitting the bottom member.

The gate through which the resin material (molten resin) is injected into the mold (cavity) may be provided at a position in the cavity other than the position corresponding to the fixing portion. In particular, it is desirable for the gate to be provided at a position corresponding to the inner peripheral edge portion on the axially opposite side of the fixing portion. With this construction, it is possible to fill the cavity uniformly with resin, thereby making it possible to perform high precision component molding. In this process, a gate cut portion as a gate mark is formed on the inner peripheral edge portion at one end of the side portion. This portion, however, is not directly related to the fixation of other components, so there is no need to separately perform finishing or the like. Thus, it is possible to reduce the number of steps and to achieve a reduction in the production cost of the housing. Regarding the gate configuration, there are no particular limitations as long as it allows the cavity to be uniformly filled with molten resin. It may be selected from a group consisting of a film gate, a point gate (inclusive of a multi-point gate), a disc gate, etc.

As stated above, on the inner peripheral edge portion of the portion on the side axially opposite to the fixing portion of the side portion, there is formed the gate cut portion as the gate mark. In this regard, when the axial dimension of the gate cut portion is larger than that of a chamfered portion provided on an outer peripheral edge of the bearing sleeve, resistance is offered when fixing the bearing sleeve to the housing, for example, when inserting the bearing sleeve into the housing. Further, abrasion powder attributable to the friction between the gate cut portion and the chamfered portion may be allowed to intrude into the bearing device to cause a deterioration in bearing performance. Thus, it is desirable for the axial dimension of the gate cut portion to be not larger than the axial dimension of the chamfered portion of the bearing sleeve.

Even after the housing and the bearing sleeve have been fixed to each other, the gate cut portion remains in the state in which it has been automatically cut by the opening/closing movement of the mold, or in the state in which it has been stamped by a punch after molding, that is, burrs, etc. are allowed to remain. It is not desirable to leave this state to stand since there is a fear of contamination due to falling of burrs, etc. On the other hand, an attempt to completely remove the burrs requires a meticulous machining operation, resulting in high cost.

In view of this, in the present invention, the gate cut portion is covered with an adhesive. This makes it possible to prevent falling of burrs, etc. by a simple measure, making it possible to solve the above problem at low cost.

There are no particular limitations regarding the resin material forming the housing as long as it is a thermoplastic resin allowing injection molding, and both an amorphous resin and a crystalline resin can be used. The resin material may be mixed as appropriate with a filler for imparting characteristics thereto, such as strength, moldability, and conductivity.

There are no particular limitations regarding the form of the radial bearing portion as long as it can generate pressure through the dynamic pressure action of a fluid. For example, it may be a dynamic pressure bearing equipped with dynamic pressure grooves of an axially inclined configuration, such as a herringbone-like configuration, a dynamic pressure bearing (multi-lobed bearing) having a plurality of wedge-like gaps in the radial bearing gap, or a dynamic pressure bearing (step bearing) in which a plurality of dynamic pressure grooves formed as axial grooves are provided at equal intervals in the circumferential direction.

The fluid dynamic bearing device, constructed as described above, can be suitably used in a motor having a rotor magnet and a stator coil, for example, a spindle motor for a disk apparatus, such as an HDD.

As described above, according to the present invention, it is possible to achieve a reduction in the production cost of the housing, and to enhance the bearing performance of a fluid dynamic bearing device without involving a problem such as contamination.

DESCRIPTION OF THE PREFERRED EMBODIMENTS

In the following, an embodiment of the present invention will be described with reference to the drawings.

Figure 1:
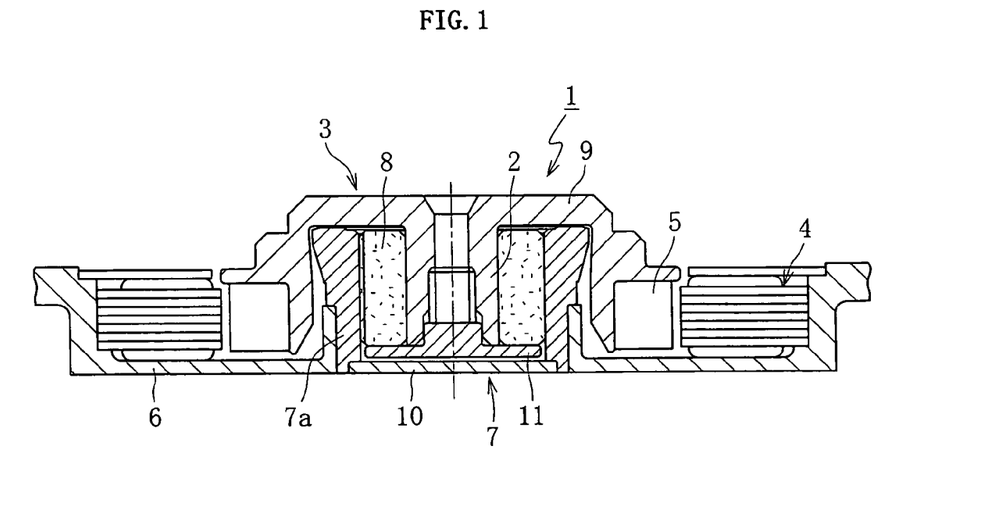
FIG. 1 is a sectional view of a spindle motor in which a fluid dynamic bearing device according to an embodiment of the present invention is incorporated.

FIG. 1 shows a construction example of an information apparatus spindle motor in which a fluid dynamic bearing device 1 according to this embodiment is incorporated. This spindle motor is used in a disk drive apparatus, such as an HDD, and is equipped with the fluid dynamic bearing device 1 supporting rotatably in a non-contact support a rotary member 3 equipped with a shaft portion 2, a stator coil 4 and a rotor magnet 5 opposed to each other through the intermediation, for example, of a radial gap, and a motor bracket (retaining member) 6. The stator coil 4 is mounted to the outer periphery of the motor bracket 6, and the rotor magnet 5 is mounted to the outer periphery of the rotary member 3. A housing 7 of the fluid dynamic bearing device 1 is fixed to the inner periphery of the motor bracket 6 by press-fitting/adhesion, etc. One or a plurality of disc-like information recording media, such as magnetic disks, are retained by the rotary member 3. When the stator coil 4 is energized, the rotor magnet 5 is rotated by an electromagnetic force generated between the stator coil 4 and the rotor magnet 5, whereby the rotary member 3 and the shaft portion 2 rotate integrally.

Figure 2:
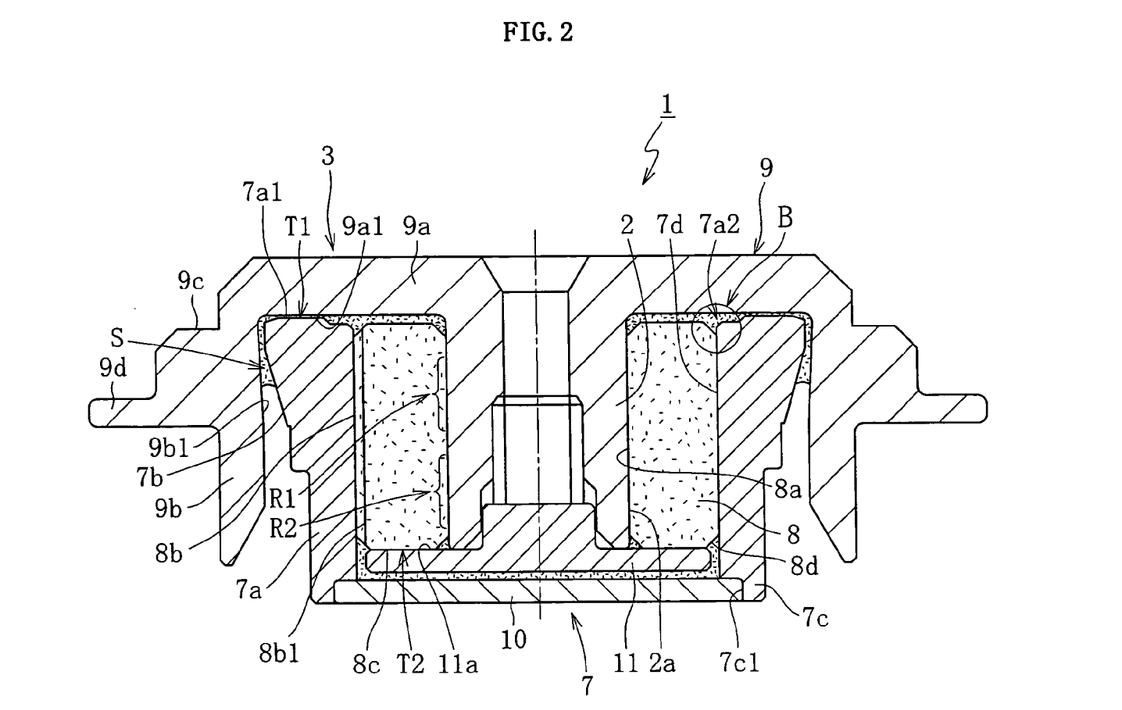
FIG. 2 is a sectional view of a fluid dynamic bearing device according to an embodiment of the present invention.

As shown, for example, in FIG. 2, the fluid dynamic bearing device 1 has, as its main components, the housing 7 composed of a side portion 7a and a bottom member 10 separate from the side portion 7a and closing an opening at one axial end of the side portion 7a, a bearing sleeve 8 retained inside the housing 7, and the rotary member 3 making relative rotation with respect to the housing 7 and the bearing sleeve 8. In the following description, for the sake of convenience, the bottom member 10 side will be referred to as the lower side, and the side axially opposite to the bottom member 10 will be referred to as the upper side.

The rotary member 3 is composed of a hub portion 9 covering, for example, the upper side of the housing 7, and the shaft portion 2 inserted into the inner periphery of the bearing sleeve 8.

The hub portion 9 is equipped with a disc portion 9a provided on top of the housing 7, a cylindrical portion 9b extending axially downwards from the outer peripheral portion of the disc portion 9a, and a disk mounting surface 9c and a flange portion 9d that are provided in the outer periphery of the cylindrical portion 9b. A disc-like information recording medium (not shown) is fitted onto the outer periphery of the disc portion 9a, and is placed on the disk mounting surface 9c. The disc-like information recording medium is retained on the hub portion 9 by appropriate retaining means (not shown).

In this embodiment, the shaft portion 2 is formed integrally with the hub portion 9, and has at its lower end a separate flange portion 11 as a detachment prevention member. The flange portion 11 is formed of metal, and is fixed to the shaft portion 2 by screws, etc.

The bearing sleeve 8 is formed as a cylinder of a porous material composed of a sintered metal, in particular, a porous material composed of a sintered metal whose main component is copper. On the outer peripheral edges at both ends of the bearing sleeve 8, there are formed chamfered portions 8d with an axial dimension of δ2 (see FIG. 5). The material of the bearing sleeve 8 is not restricted to a sintered metal. For example, it is also possible to form the bearing sleeve 8 of a soft metal, such as brass.

Figure 3A:
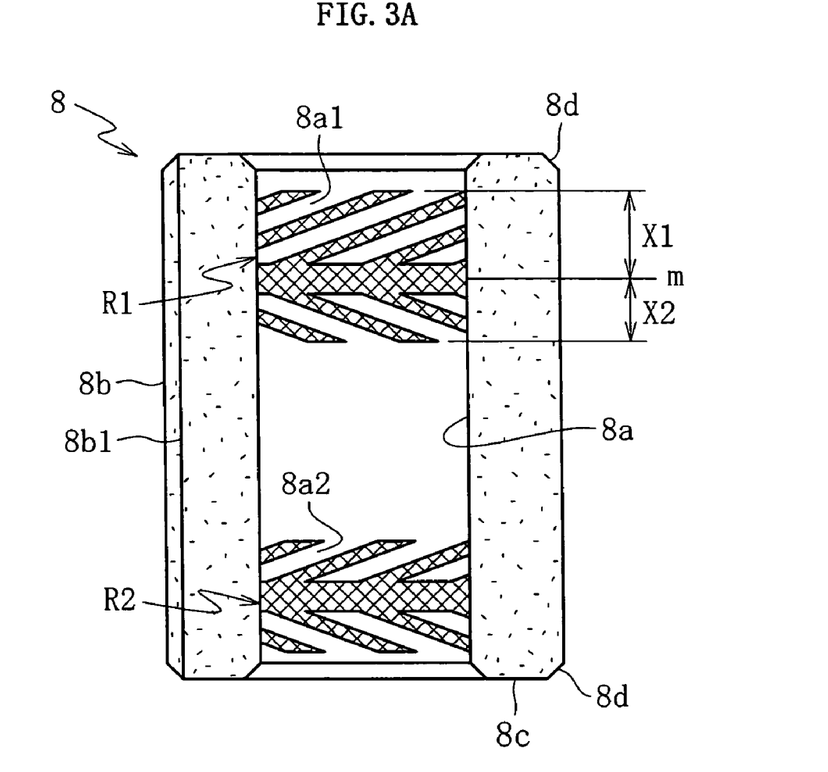
FIG. 3A is a sectional view of a bearing sleeve.

As shown in FIG. 2, on an inner peripheral surface 8a of the bearing sleeve 8, there are provided, so as to be axially spaced apart from each other, two upper and lower regions constituting a first radial bearing portion R1 and a second radial bearing portion R2. As shown, for example, in FIG. 3A, in the above-mentioned two regions, there are formed herringbone-shaped dynamic pressure grooves 8a1 and 8a2, respectively. The upper dynamic pressure grooves 8a1 are formed asymmetrically with respect to an axial center m (axial center of the region between the upper and lower inclined grooves), with the axial dimension X1 of the region on the upper side of the axial center m being larger than the axial dimension X2 of the region on the lower side thereof. Further, in an outer peripheral surface 8b of the bearing sleeve 8, there are formed one or a plurality of axial grooves 8b1 so as to extend over the entire axial length. In this embodiment, there are formed three axial grooves 8b1 at equal circumferential intervals.

Figure 3B:
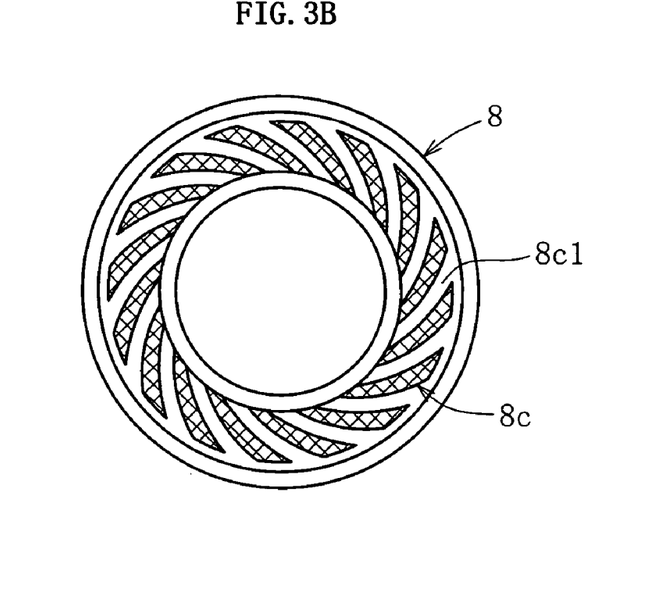
FIG. 3B is a diagram showing the lower end surface of the bearing sleeve.

Further, as shown, for example, in FIG. 3B, in a partially annular region of the lower end surface 8c of the bearing sleeve 8 constituting the thrust bearing surface of the thrust bearing portion T2, there are formed a plurality of dynamic pressure grooves 8c1 arranged, for example, in a spiral configuration.

The housing 7 is formed by the substantially cylindrical side portion 7a, and the bottom member 10 serving as the bottom portion closing the lower opening of the side portion 7a. The side portion 7a is formed by injection molding of a resin material. Although not shown, in a partially annular region constituting the thrust bearing surface of the thrust bearing portion T1 at the upper end surface 7a1 of the side portion 7a, there are formed a plurality of dynamic pressure grooves arranged, for example, in a spiral configuration. A form corresponding to these dynamic pressure grooves is imparted to the surface of the mold for molding the side portion 7a, and these grooves are formed simultaneously with the molding of the side portion 7a.

As shown in FIG. 2, in the outer periphery of the side portion 7a, there is formed a tapered outer wall 7b gradually diverging upwards. Between the tapered outer wall 7b and the inner peripheral surface 9b1 of the cylindrical portion 9b, there is formed an annular seal space S whose radial dimension gradually diminishes upwardly from the lower end of the housing 7. During rotation of the shaft portion 2 and the hub portion 9, the seal space S communicates with the outer periphery of the thrust bearing gap of the thrust bearing portion T1.

In the inner periphery of the lower end of the side portion 7a, there is formed a fixing portion 7c, to which the bottom member 10 is fixed. The inner peripheral surface 7c1 of the fixing portion 7c has a larger diameter than the inner peripheral surface 7d retaining the bearing sleeve 8, and the wall thickness of the fixing portion 7c is smaller than that of the disc portion of the side portion 7a (the region other than the fixing portion 7c). Further, in the inner periphery of the upper end of the side portion 7a, there is formed an inner peripheral edge portion 7a2. As shown in FIG. 4B, the inner peripheral edge portion 7a2 means the portion of the inner peripheral surface 7d of the side portion 7a near the upper end thereof, and includes the upper end of the inner peripheral surface 7d forming the axial cylindrical surface, and a tapered portion 7f adjacent thereto.

As stated above, the housing 7 (the side portion 7a) is formed by injection molding of a resin material, so that it can be reduced in weight as compared, for example, with a conventional metal housing formed by machining, and further, each portion thereof can be formed with high precision. Further, it helps to achieve a reduction in the cost for forming the housing. Further, the dynamic pressure grooves are formed simultaneously with the injection molding, so that it is possible to achieve a reduction in the cost for forming the dynamic pressure grooves.

There are no particular limitations regarding the resin material for forming the side portion 7a as long as it is a thermoplastic resin allowing injection molding. Examples of amorphous resins that can be used include polysulfone (PSU), polyether sulfone (PES), polyphenyl sulfone (PPSU), and polyether imide (PEI). Examples of crystalline resins that can be used include liquid crystal polymer (LCP), polyetherether ketone (PEEK), polybutylene terephthalate (PBT), and polyphenylene sulfide (PPS).

It is possible to mix a filler as appropriate into the above-mentioned resin materials to impart various characteristics thereto. For example, in order to achieve an improvement in strength and moldability, it is possible to mix a fibrous filler such as glass fiber, a whisker filler such as potassium titanate, or a scaly filler such as mica. Further, to impart conductivity to the resin material, it is possible to mix, for example, a fibrous or powdered conductive filler such as carbon fiber, carbon black, graphite, carbon nanomaterial, or metal powder. Such filler may be used singly, or two or more kinds of filler may be used in a mixed state.

The bottom member 10 is formed of a metal material, such as brass or aluminum alloy, and is fixed to the inner periphery of the fixing portion 7c formed in the inner periphery of the lower end of the side portion 7a by press-fitting, press-fitting/adhesion, etc.

Figure 4A:
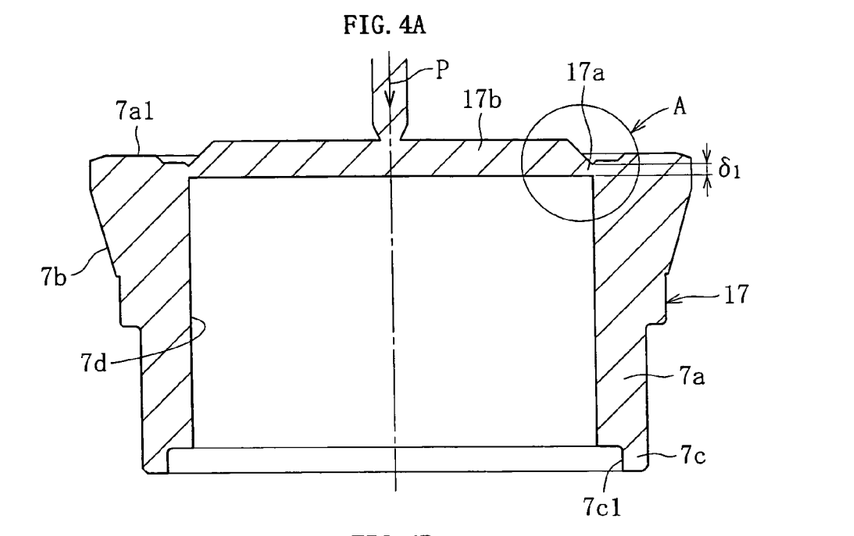
FIG. 4A is a sectional view conceptually showing a housing molding process.
Figure 4B:
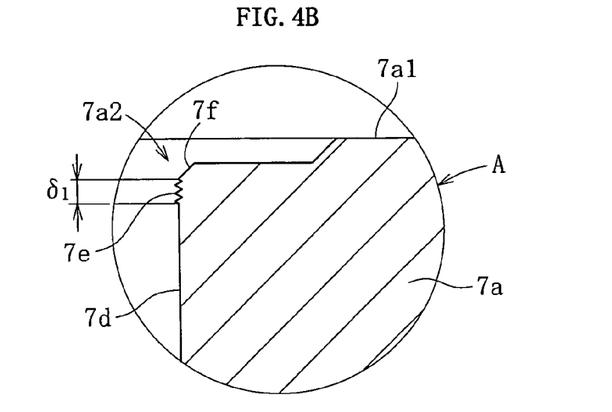
FIG. 4B is an enlarged view of a portion A of FIG. 4A.

FIGS. 4A and 4B are conceptual drawings illustrating the injection molding process for forming the housing 7 (the side portion 7a). In the mold, which is composed of a stationary mold and a movable mold, there are provided a cavity 17, a gate 17a, and a runner 17b. The gate 17a, which has an axial dimension of δ1, is provided at a position of the mold corresponding to the inner peripheral edge portion 7a2 of the side portion 7a. As described below, in the example shown in the drawings, the gate 17a is provided at a position corresponding to the upper end of the inner peripheral surface 7d of the side portion 7a in view of the convenience in stamping the gate 17a in the axial direction with a punch. When, for example, some other gate cutting method is adopted, it is also possible to provide the gate 17a at a position corresponding to the tapered portion 7f.

A resin material (molten resin) P injected from the nozzle of an injection molding machine (not shown) passes the runner 17b and the gate 17a of the mold to fill the cavity 17. In this way, by filling the cavity 17 with molten resin P from the gate 17a provided at a position corresponding to the inner peripheral edge portion 7a2 in the inner periphery of the upper end of the side portion 7a, the molten resin P fills the cavity 17 uniformly in the circumferential direction and in the axial direction, so it is possible to form the side portion 7a with high precision. There are no particular limitations regarding the configuration of the gate 17a as long as it allows the cavity 17 to be uniformly filled with the molten resin P. For example, it is possible to adopt, apart from a point gate (multi-point gate) provided at one or a plurality of positions in the circumference at a position corresponding to the inner peripheral edge portion 7a2, an annular film gate, a disc gate, etc.

After the molten resin P filling the cavity 17 has been cooled and solidified, the movable mold is moved to open the mold. Then, the molding is extracted from the mold, and the gate 17a is stamped with a punch, whereby, as shown in FIG. 4B, a gate cut portion 7e as a gate mark of the gate 17a is formed on the inner peripheral edge portion 7a2. Like the gate 17a, the gate cut portion 7e has an axial dimension of δ1.

Conventionally, the gate is provided at a position in the cavity 17 corresponding to the fixing portion 7c. To fix the bottom member 10 to the fixing portion 7c with high accuracy by press-fitting, the dimensional precision required is rather strict, so finishing is performed through meticulous machining. As a result, an increase in processing cost is unavoidable, and the advantage in terms of cost achieved by using resin cannot be enjoyed to a sufficient degree. As is apparent from FIG. 4A, in this embodiment, in contrast, the fixing portion 7c is a molding surface obtained through solidification of the injection-molding resin in conformity with the inner surface of the mold. Thus, it is possible to form the fixing portion 7c with much higher accuracy and at a much lower cost than in the case of the conventional fixing portion obtained by machining.

Further, when machining is performed, the filler in the resin material, for example, is exposed on the surface to generate foreign matter. When such foreign matter remains at the fixing portion 7c, the foreign matter may enter the interior of the bearing device to constitute a contaminant after press-fitting the bottom member 10, thereby deteriorating the bearing performance. In this embodiment, in contrast, the fixing portion 7c is a molding surface, so no filler is exposed on the surface, and generation of foreign matter attributable thereto is suppressed, thus making it possible to avoid danger of a deterioration in bearing performance.

Next, the process for assembling the fluid dynamic bearing device 1 of this embodiment will be described.

Figure 5:
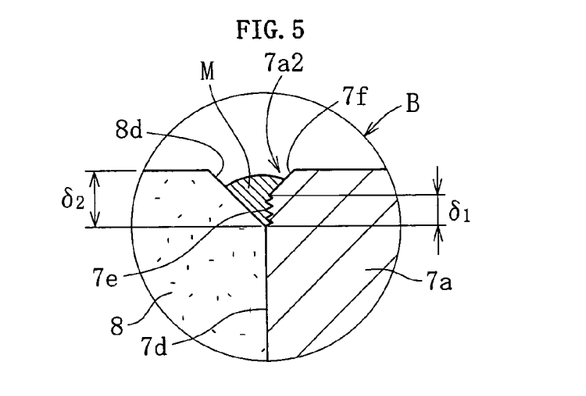
FIG. 5 is an enlarged sectional view of a portion B of FIG. 2.

First, the bearing sleeve 8 is fixed to the inner peripheral surface 7d of the side portion 7a constituting the housing 7 by press-fitting/adhesion, etc. As shown in FIG. 5, the axial dimension δ1 of the gate cut portion 7e formed on the inner peripheral edge portion 7a2 at the upper end of the side portion 7a is not larger than the axial dimension δ2 of the chamfered portion 8d provided on the outer peripheral edge at either end of the bearing sleeve 8 ($δ1 \leq δ2$). If $δ1 > δ2$, resistance is offered when, for example, inserting the bearing sleeve 8 into the housing 7. Further, there is a fear of the bearing sleeve 8 not being fixed at a predetermined position. Further, there is a fear of a deterioration in bearing performance due to generation of foreign matter attributable to the friction between the gate cut portion 7e and the chamfered portion 8d. In the construction of this embodiment, in contrast, no such problem is involved, and the bearing sleeve 8 can be press-fitted easily.

After the bearing sleeve 8 is fixed to the side portion 7a, an adhesive M is caused to fill the space formed by the chamfered portion 8d formed on the bearing sleeve 8 and the inner peripheral edge portion 7a2 of the side portion 7a opposed thereto so as to cover the gate cut portion 7e.

Even after the fixation, the gate cut portion 7e remains in the state in which the gate 17a has been stamped with the punch and cut, that is, in the state in which burrs are allowed to stay. When the bearing device is operated with this state being left to stand, a portion (burrs) of the gate cut portion 7e may enter the interior of the bearing device to constitute a contaminant, thereby deteriorating the bearing performance. If finishing is performed on the gate cut portion 7e by machining or the like, it is necessary to meticulously conduct polishing, foreign matter removing operation after the polishing, etc., resulting in a rather high cost. In this embodiment, in contrast, it is possible to prevent falling of burrs and, by extension, generation of contaminant by the very simple and inexpensive means of filling with the adhesive M.

Next, the shaft portion 2 formed integrally with the hub portion 9 is inserted into the bearing sleeve 8 fixed to the side portion 7a. After that, the flange portion 11 is mounted to the shaft portion 2 by, for example, screws, and then the bottom member 10 is fixed to the inner periphery of the fixing portion 7c of the side portion 7a by press-fitting or press-fitting/adhesion.

When the assembly is completed as described above, the shaft portion 2 of the rotary member 3 is inserted into the bore defined by the inner peripheral surface 8a of the bearing sleeve 8, and the flange portion 11 is accommodated in the space between the lower end surface 8c of the bearing sleeve 8 and the upper end surface 10a of the bottom member 10. After that, the inner space of the fluid dynamic bearing device 1, inclusive of the internal voids of the bearing sleeve 8, is filled with a fluid (lubricating fluid), such as a lubricating oil. At this time, the oil level of the lubricating oil is maintained within the range of the seal space S.

In the fluid dynamic bearing 1, constructed as described above, when the rotary member 3 (the shaft portion 2) rotates, the upper and lower two regions of the inner peripheral surface 8a of the bearing sleeve 8 constituting the radial bearing surfaces are opposed to the outer peripheral surface 2a of the shaft portion 2 through the intermediation of the radial bearing gap. As the shaft portion 2 rotates, there is generated a dynamic pressure action due to the lubricating oil filling the radial bearing gap, and by this pressure, there are formed the first radial bearing portion R1 and the second radial bearing portion R2 supporting the shaft portion 2 rotatably in a non-contact support in the radial direction.

Further, between the upper end surface 7a1 of the side portion 7a of the housing 7 and the lower end surface 9a1 of the hub portion 9 formed integrally with the shaft portion 2, there is formed a thrust bearing gap (not shown). As the rotary member 3 rotates, there is generated in this thrust bearing gap a dynamic pressure action due to the lubricating oil, and by this pressure, there is formed the first thrust bearing portion T1 supporting the rotary member 3 rotatably in a non-contact support in the thrust direction. Similarly, between the lower end surface 8c of the bearing sleeve 8 and the upper end surface 11a of the flange portion 11, there is formed a thrust bearing gap, and in this bearing gap, there is generated a dynamic pressure action due to the lubricating oil, thus forming the second thrust bearing portion T2 supporting the rotary member 3 in a non-contact support in the thrust direction.

As described above, in the construction of the present invention, when forming the housing 7 and assembling the fluid dynamic bearing device 1, it is possible to eliminate all kinds of machining operation, so it is possible to achieve a substantial reduction in production cost. In the fluid dynamic bearing device 1, constructed as described above, a thrust bearing gap (the thrust bearing portion T1) is formed between the upper end surface 7a1 of the housing 7 and the lower end surface 9a1 of the rotary member 3 (the hub portion 9), whereby the seal space S is formed in the outer periphery of the housing 7, thereby achieving a reduction in the size (thickness) of the bearing device. Further, due to the reduction in weight through formation of the housing 7 of a resin material, the bearing device is suitably applicable, in particular, to a spindle motor for a portable information apparatus.

Figure 6:
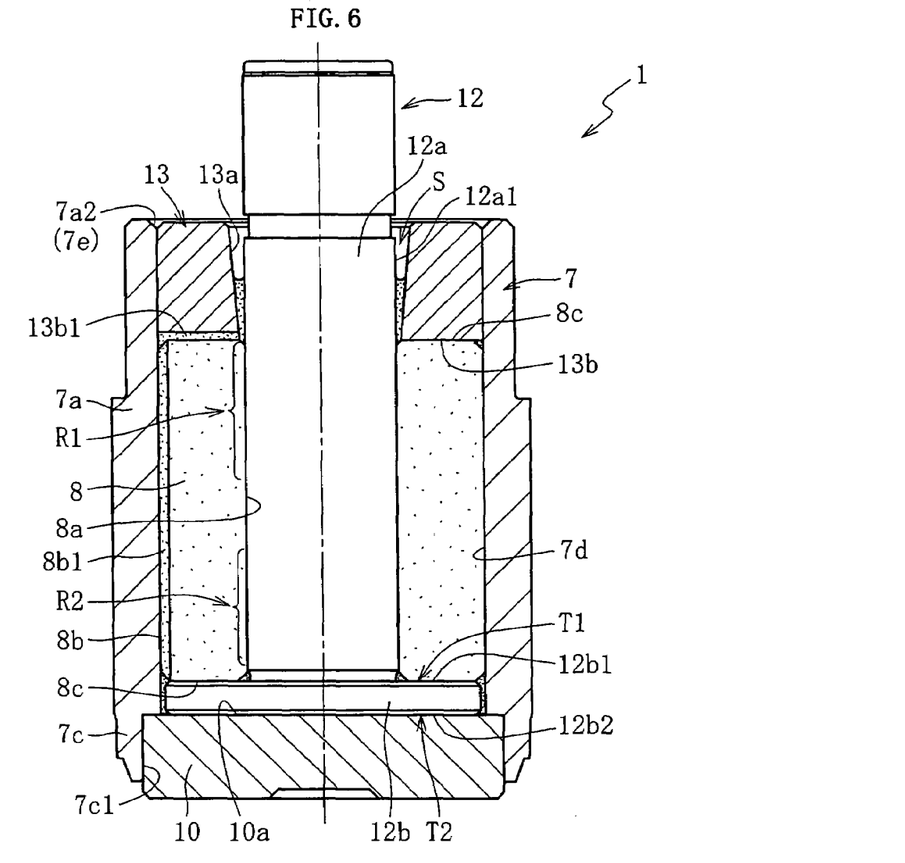
FIG. 6 is a sectional view showing another construction example of a fluid dynamic bearing device.

The present invention is not restricted to the above-described construction. It is suitably applicable to any construction in which there is provided a fixing portion 7c for fixing a bottom member 10 to the inner periphery of one end portion of a resin side portion 7a. FIG. 6 shows an example of such a construction, in which, as in the above-described one, it is possible to form a light-weight and high-precision housing 7 while achieving a reduction in production cost. In the drawing, the components and elements that are the same as those of the embodiment shown in FIG. 2 are indicated by the same reference symbols, and a redundant description thereof will be omitted.

The fluid dynamic bearing device 1 shown in FIG. 6 has, as its main components, a shaft member 12 having a shaft portion 12a at its rotation center and an outwardly protruding flange portion 12b at one end thereof, a bearing sleeve 8 whose inner periphery allows insertion of the shaft portion 12a, a housing 7 to the inner periphery of which the bearing sleeve 8 is fixed, and a seal member 13 sealing an opening at one end of the housing 7. In the fluid dynamic bearing device 1, a hub portion 9 (not shown), which is separate from the shaft member 12, is fixed by press-fitting or the like to constitute the rotary member after the completion of the bearing device.

In this embodiment, the first thrust bearing portion T1 is formed by the upper end surface 12b1 of the flange portion 12b and the lower end surface 8c of the bearing sleeve 8 opposed thereto, and the second trust bearing portion T2 is formed by the lower end surface 12b2 of the flange portion 12b and the upper end surface 10a of the bottom member 10 opposed thereto. Further, a seal space S is formed between the outer peripheral surface 12a1 of the shaft portion 12a and the inner peripheral surface 13a of the seal member 13. A radial groove 13b1 is formed in the lower end surface 13b of the seal member 13.

While in the constructions described above the dynamic pressure action of a fluid is generated by herringbone-shaped or spiral dynamic pressure grooves in the radial bearing portions R1 and R2 and the thrust bearing portions T1 and T2, the present invention is not restricted to such constructions.

For example, it is also possible to adopt a so-called multi-lobed bearing or a step bearing as the radial bearing portion R1, R2.

Figure 7:
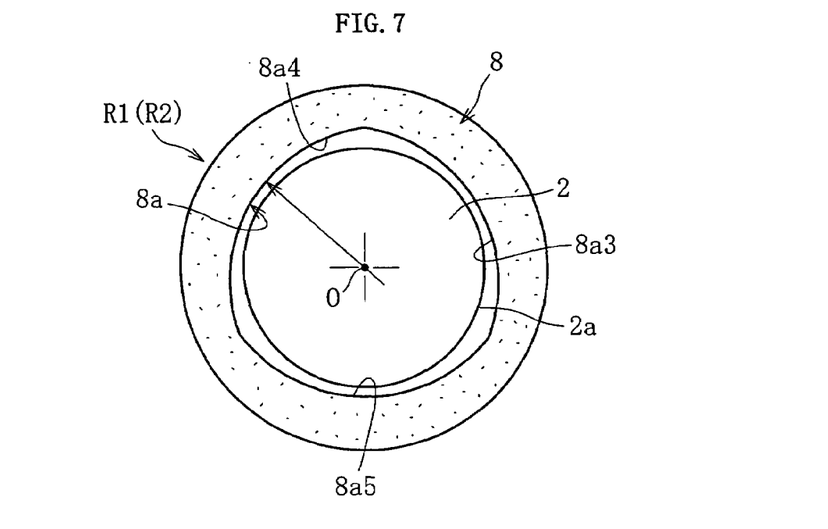
FIG. 7 is a sectional view showing another construction example of a radial bearing portion.

FIG. 7 shows an example in which one or both of the radial bearing portions R1 and R2 is formed by a multi-lobed bearing. In this example, the region of the inner peripheral surface 8a of the bearing sleeve 8 constituting the radial bearing surface is composed of three arcuate surfaces 8a3, 8a4, and 8a5 (to form a so-called three-arc bearing). The centers of curvature of the three arcuate surfaces 8a3, 8a4, and 8a5 are offset from the axial center O of the bearing sleeve 8 by the same distance. In each of the regions defined by the three arcuate surfaces 8a3, 8a4, and 8a5, the radial bearing gap gradually diminishes in a wedge-like fashion in both circumferential directions. Thus, when the bearing sleeve 8 and the shaft portion 2 (the rotary member 3) make relative rotation, the lubricating fluid in the radial bearing gap is forced toward either of the minimum gap sides diminished in a wedge-like fashion according to the direction of the relative rotation, and undergoes an increase in pressure. Due to the dynamic pressure action of this lubricating fluid, the bearing sleeve 8 and the shaft portion 2 are supported in a non-contact support. It is also possible to form axial grooves that are one step deeper and called separation grooves in the boundary portions between the three arcuate surfaces 8a3, 8a4, and 8a5.

Figure 8:
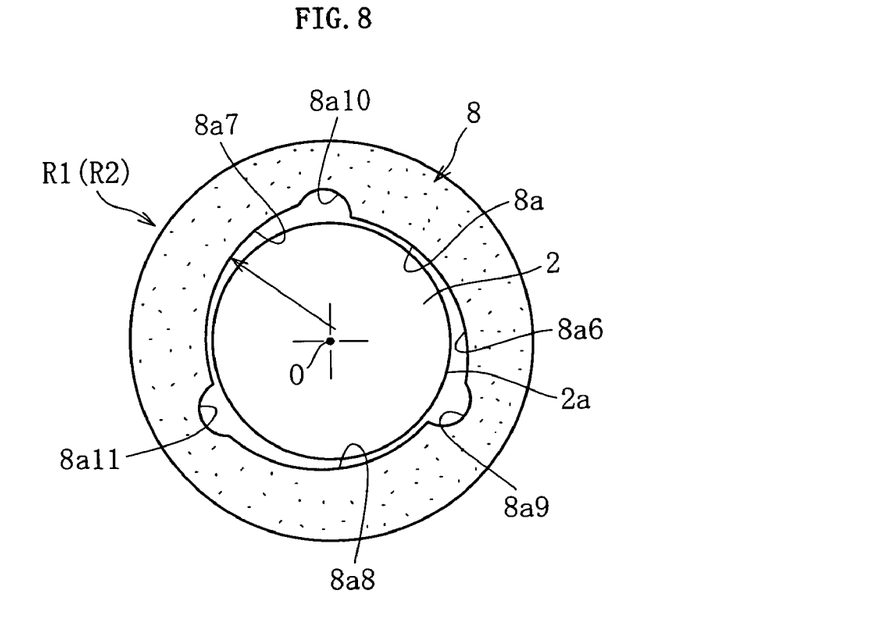
FIG. 8 is a sectional view showing still another construction example of a radial bearing portion.

FIG. 8 shows another example of the case in which one or both of the radial bearing portions R1 and R2 are formed by multi-lobed bearings. In this example also, the region constituting the radial bearing surface of the inner peripheral surface 8a of the bearing sleeve 8 are formed by three arcuate surfaces 8a6, 8a7, and 8a8 (to form a so-called three-arc bearing). In each of the regions defined by the three arcuate surfaces 8a6, 8a7, and 8a8, the radial bearing gap is configured so as to gradually diminish in a wedge-like fashion in one circumferential direction. A multi-lobed bearing thus constructed is sometimes called a tapered bearing. Further, in the boundary portions between the three arcuate surfaces 8a6, 8a7, and 8a8, there are formed axial grooves 8a9, 8a10, and 8a11 that are called separation grooves and that are one step deeper. Thus, when the bearing sleeve 8 and the shaft portion 2 make relative rotation in a predetermined direction, the lubricating fluid in the radial bearing gap is forced into the minimum gap portions diminished in a wedge-like fashion, and undergoes an increase in pressure. By the dynamic pressure action of this lubricating fluid, the bearing sleeve 8 and the shaft portion 2 are supported in a non-contact support.

Figure 9:
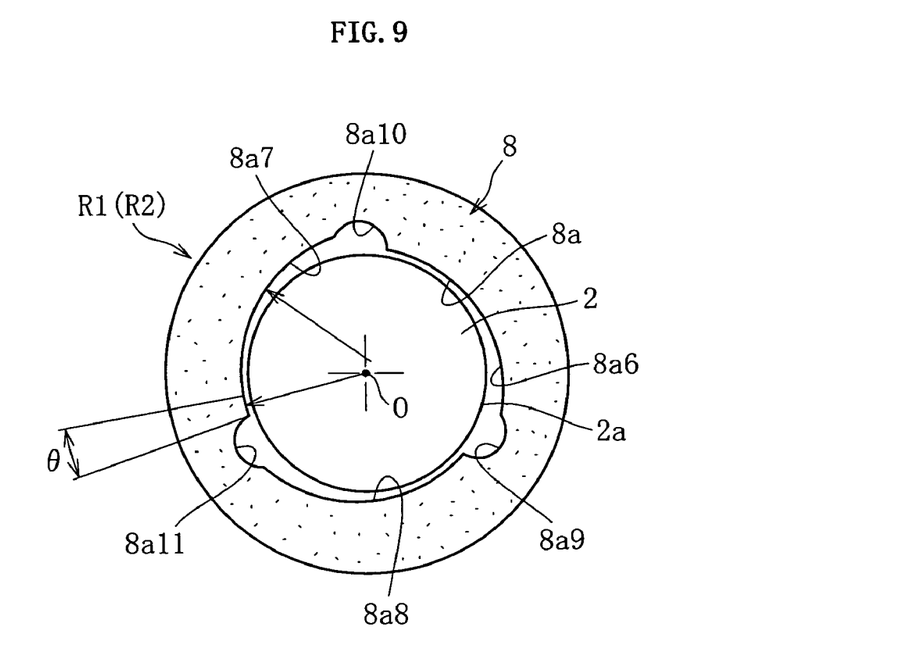
FIG. 9 is a sectional view showing further another construction example of a radial bearing portion.

FIG. 9 shows another example of the case in which one or both of the radial bearing portions R1 and R2 are formed by multi-lobed bearings. In this example, predetermined regions α on the minimum gap side of the three arcuate surfaces 8a6, 8a7, and 8a8 in the construction shown in FIG. 8 are formed by concentric arcs whose centers of curvature coincide with the axial center O of the bearing sleeve 8. Thus, in each predetermined region α, the radial bearing gap (minimum gap) is constant. A multi-lobed bearing thus constructed is sometimes called a tapered flat bearing.

While each of the multi-lobed bearings of the above examples is a so-called three-arc bearing, this should not be construed restrictively. It is also possible to adopt a so-called four-arc bearing or five-arc bearing, or a multi-lobed bearing formed by six or more arcuate surfaces. Further, in forming the radial bearing portion by a multi-lobed bearing, it is possible to adopt, apart from the construction in which two radial bearing portions are axially spaced apart from each other as in the case of the radial bearing portions R1 and R2, a construction in which a single radial bearing portion is provided to extend over the vertical region of the inner peripheral surface 8a of the bearing sleeve 8.

It is also possible for one or both of the radial bearing portions R1 and R2 to be formed by step bearings (not shown). A step bearing is a bearing in which, for example, in the region of the inner peripheral surface 8a of the bearing sleeve 8 constituting a radial bearing surface, there are provided a plurality of dynamic pressure grooves in the form of a plurality of axial grooves provided at predetermined circumferential intervals.

Further, although not shown, one or both of the thrust bearing portions T1 and T2 may be formed by so-called step bearings, so-called undulated bearings (undulated step bearings) or the like, in which, for example, in the regions constituting thrust bearing surfaces, there are provided a plurality of dynamic pressure grooves in the form of radial grooves arranged at predetermined circumferential intervals.

While in the above embodiments a lubricating oil is used as the lubricating fluid filling the interior of the fluid dynamic bearing device 1, it is also possible to use some other fluid capable of generating dynamic pressure in each bearing gap, for example, a magnetic fluid or a gas, such as air.

While the above-described dynamic pressure bearing has dynamic pressure generating means, such as dynamic pressure grooves, in the radial bearing portion, the construction of the present invention is also suitably applicable, apart from such a dynamic pressure bearing, to a fluid lubrication•bearing adopting a so-called cylindrical bearing having no dynamic pressure generating means in the radial bearing portion.

What is claimed is:

1. A fluid dynamic bearing device comprising:
    a housing formed as a bottomed cylinder;
    a bearing sleeve retained in an inner periphery of the housing;
    a rotary member having a shaft portion inserted into the bearing sleeve and adapted to rotate around a rotation center axis; and
    a radial bearing portion supporting the rotary member in a radial direction in a non-contact support by a dynamic pressure action of a fluid generated in a radial bearing gap between the bearing sleeve and the shaft portion of the rotary member, wherein:
    the housing has a side portion formed in a substantially cylindrical configuration of a resin material by injection molding, a bottom member fixed to a fixing portion provided in an inner periphery of one axial end of the side portion and closing an opening at one axial end of the side portion, and a gate cut portion facing a chamfered portion in the radial direction, the gate cut portion being covered with an adhesive and is provided on an inner peripheral edge portion at another axial end of the side portion; and
    each of a first surface in the fixing portion, which is in contact with an outer peripheral surface of the bottom member, and a second surface in the fixing portion, which is in contact with an axial end surface of the bottom member, is a molding surface.

2. A fluid dynamic bearing device according to claim 1, wherein the gate cut portion has an axial dimension which is equal to or less than an axial dimension of the chamfered portion provided at an outer peripheral edge of the bearing sleeve.

3. A fluid dynamic bearing device according to claim 1, wherein the radial bearing portion has a plurality of dynamic pressure grooves as dynamic pressure generating means.

4. A fluid dynamic bearing device according to claim 1, wherein the radial bearing portion is formed of a multi-lobed bearing.

5. A spindle motor comprising: a fluid dynamic bearing device according to claim 1, a rotor magnet, and a stator coil.

6. A fluid dynamic bearing device according to claim 1, wherein the gate cut portion has an axial dimension which is equal to or less than a dimension in the axial direction of the chamfered portion provided at an outer peripheral edge of a seal member.

* * * * *